United States Patent [19]
Orbach et al.

[11] Patent Number: 5,684,691
[45] Date of Patent: Nov. 4, 1997

[54] METHOD AND APPARATUS FOR CONTROLLING DRAFT OF AN AGRICULTURAL IMPLEMENT

[75] Inventors: Abraham Orbach, Naperville; William J. Schubert, Downers Grove, both of Ill.

[73] Assignee: Case Corporation, Racine, Wis.

[21] Appl. No.: 422,823

[22] Filed: Apr. 17, 1995

[51] Int. Cl.⁶ .................................................. G05B 19/18
[52] U.S. Cl. .................... 364/167.01; 364/424.07; 172/2; 172/4; 172/8
[58] Field of Search ................ 172/2, 4, 8; 364/424.07, 364/167.01

[56] References Cited

U.S. PATENT DOCUMENTS

| | | | |
|---|---|---|---|
| 3,653,446 | 4/1972 | Kalmon | 172/4 |
| 4,132,273 | 1/1979 | Mortonson et al. | 172/2 |
| 4,231,432 | 11/1980 | Jennings | 172/7 |
| 4,508,176 | 4/1985 | Wiegardt et al. | 171/7 |
| 4,518,044 | 5/1985 | Wiegardt et al. | 172/7 |
| 4,809,785 | 3/1989 | Arnold et al. | 172/9 |
| 4,817,499 | 4/1989 | Bellanger et al. | 91/361 |
| 4,846,283 | 7/1989 | Batcheller | 172/10 |
| 4,886,123 | 12/1989 | Arnold et al. | 172/7 |
| 4,931,967 | 6/1990 | Boe et al. | 364/571.01 |
| 4,969,527 | 11/1990 | Boe et al. | 172/7 |
| 4,979,092 | 12/1990 | Bergese et al. | 364/148 |
| 4,995,772 | 2/1991 | Biggio et al. | 414/458 |
| 5,012,415 | 4/1991 | Boe et al. | 364/424.07 |
| 5,082,081 | 1/1992 | Tsuyama et al. | 180/197 |
| 5,092,409 | 3/1992 | Defrancq | 172/4.5 |
| 5,143,159 | 9/1992 | Young et al. | 172/8 |
| 5,261,495 | 11/1993 | Szymczak | 172/2 |
| 5,291,407 | 3/1994 | Young et al. | 364/424.07 |
| 5,309,700 | 5/1994 | Winkels et al. | 56/10.2 |
| 5,320,186 | 6/1994 | Strosser et al. | 172/8 |
| 5,356,238 | 10/1994 | Musil et al. | 404/84.1 |
| 5,401,115 | 3/1995 | Musil et al. | 404/72 |
| 5,421,416 | 6/1995 | Orbach et al. | 172/4 |
| 5,469,921 | 11/1995 | Orbach et al. | 172/4 |
| 5,472,056 | 12/1995 | Orbach | 172/2 |
| 5,549,166 | 8/1996 | Orbach et al. | 172/4 |

*Primary Examiner*—Reba I. Elmore
*Assistant Examiner*—Ramesh Patel
*Attorney, Agent, or Firm*—Foley & Lardner

[57] ABSTRACT

A control system for regulating the elevational position of an implement carried or trailed by a vehicle, such as a tractor, includes draft force sensors for detecting the draft force produced by interaction of the implement with the ground, and a command device for setting a reference level of draft force. A control circuit coupled to the sensors and to the command device generates a draft force error signal representing the deviation of the sensed draft force from the desired level, and a draft force derivative signal representing the rate of change of the sensed draft force. The control circuit generates control signals for raising and lowering the implement following a predetermined control routine in response at least to the draft error signals. The rate of movement of the implement in response to the control signals is limited in response to the draft force error signal and the draft derivative signal. The limit on the rate of movement of the implement is preferably determined through fuzzy logic wherein the draft error signals and draft derivative signals are classified into sets and the rate limit is derived from the degree of membership of the signals in the sets. The control system also preferably generates a weight signal representative of the weight of the implement and membership functions defining the sets are selected based on categorization of the implement weight.

14 Claims, 6 Drawing Sheets

METHOD AND APPARATUS FOR CONTROLLING DRAFT OF AN AGRICULTURAL IMPLEMENT

BACKGROUND OF THE INVENTION

1. Field of the Invention

The present invention relates generally to the field of control systems for agricultural implements. More particularly, the invention relates to a system for controlling the position of a ground penetrating implement based at least in part on the draft force encountered by the implement wherein the system's rate of response to changes in draft force is automatically set without requiring operator intervention.

2. Description of the Prior Art

A number of control arrangements have been proposed for regulating the position or elevation of implements, such as plows and the like, attached to or drawn by agricultural vehicles. Such control systems generally sense the position of a three-point hitch and compare this sensed position to a command or desired position set by an operator. Based upon the deviation of the sensed position from the command position, the hitch, along with the implement mounted on it, is raised or lowered to maintain the desired elevation.

In recent years a more sophisticated hitch control systems have become commonplace. Such systems typically sense operating parameters other than hitch assembly position, such as draft force generated by the interaction of the implement with the ground, engine speed and wheel slip. Based on the particular control routine implemented by the controller, these sensed parameter values are combined or compared to target or reference values to determine whether the hitch assembly should be raised, lowered or maintained at its current level. The resulting hitch control permits the machine operator to set certain key operating characteristics at desired values and then direct his attention to the work at hand, thereby freeing the operator from having constantly to regulate the height of the implement as field and operating conditions change.

A particularly useful aspect of such control systems has been regulation of hitch assembly elevation based upon the draft force generated against a working implement as it is drawn over or through the ground. While the particular control schemes adopted by various manufacturers have differed considerably, most make use of a draft or load reference value and compare this reference value to a parameter value representative of the draft force sensed during operation of the implement. In certain known system, the reference draft value may be set by an operator interface device. In general, during operation of these systems, when the sensed draft force value exceeds the reference draft value by a given amount, the hitch assembly is raised to reduce draft force. Inversely, when the sensed draft force is too low, the implement is lowered, usually increasing penetration of an implement into the ground and thereby increasing draft force.

Such systems function well for maintaining a desired degree of draft force while limiting the load on the tractor when draft force becomes excessive, such as due to differing soil types and conditions in various parts of a field. However, these systems sometimes tend to make frequent or relatively sudden adjustments in hitch position as field conditions change. Because such adjustments are ultimately fatiguing for the machine operator, systems of this type are often equipped with a response adjustment designed to limit the rate of hitch movement resulting from draft load errors.

While this response adjustment permits an operator to obtain a smoother ride during control of implement position based on the sensed draft force, it also requires the operator to set the desired response level. Moreover, under certain field conditions different response rates may be appropriate for different areas of a field, requiring the operator to adjust the response rate accordingly as such areas are worked. For example, on terrain of varying elevation (i.e. having frequent dips and mounds) it is often desirable to set the response rate at a fairly high level, making the system more aggressive to changes in sensed draft force. On the contrary, when the vehicle moves onto more flat or even terrain, such higher rates of response result in an over-sensitive system that tends to make jerky reactions to relatively minor changes in draft force. Similarly, when the operator works the same areas with implements of different weight and type, the appropriate draft error response rates may be different and require further adjustment.

It would be advantageous to provide an implement control system that maintains a desired level of draft force and is capable of automatically adjusting the rate of implement movement in response to deviations from the desired draft force. Furthermore, such a system would preferably take into account the relative weight of the implement being positioned in order to set a response level that accommodates the load being raised and lowered with each adjustment in the implement position.

SUMMARY OF THE INVENTION

The present invention relates to a system for controlling the position of an implement carried or trailed by a vehicle, such as an agricultural tractor, in which the elevation of the implement is at least partially regulated in response to a reference and a sensed level of draft force. The responsiveness of the system to deviations of the sensed draft force from the reference level is automatically adjusted without requiring operator intervention. Such automatic adjustments are preferably based upon the magnitude of the draft error and upon the derivative of the draft error. The responsiveness adjustment preferably limits the maximum effective current the control system can apply to solenoid operated hydraulic control valving. This, in turn, limits the speed or rate of movement of the actuator positioning the implement.

Thus, in accordance with a first aspect of the invention, an implement position control system includes a draft sensor, a draft force command device, a control circuit and a response signal generating circuit. The draft sensor detects the draft force on the implement caused by interaction of the implement with the ground and generates draft force signals representative thereof. The draft force command device establishes draft force reference signals. The control circuit is coupled to the draft force sensor and to the draft force command device and determines draft force error values based upon the difference between the draft force signals and the draft force reference signals. The control circuit also generates control signals for causing movement of an actuator for selectively raising and lowering the implement based at least upon the draft force error values. The response signal generating circuit is coupled to the control circuit and automatically limits the response rate of the actuator in response to the control signals.

The invention also relates to a novel method for controlling the rate of elevational movement of an implement carried or trailed by a vehicle and capable of being raised and lowered in response to control signals. In accordance with this method, a draft force resulting from interaction between the implement, the ground is sensed and a desired level of draft force is set and a draft error value is generated. This draft error value is representative of the difference between the sensed draft force and the desired draft force. Control signals are generated to selectively raise and lower the implement based at least on the draft error value and the rate of movement of the implement in response to the control signals is limited based at least on the draft error value. In a particularly preferred variant on this method, the rate of movement of the implement is limited based also on the time derivative of the sensed draft force.

In accordance with a further aspect of the invention, a method for controlling the elevation of an implement carried or trailed by a vehicle is provided wherein a parameter proportional to the weight of the implement is sensed and a weight signal is produced representative thereof. Control signals are generated for moving an actuator to selectively raise and lower the implement and the rate of movement of the implement is limited based upon the weight signal.

BRIEF DESCRIPTION OF THE DRAWINGS

These and other features of the invention will be more fully understood by reference to the following description and the appended FIGURES, wherein like reference numerals designate like elements and in which.

DETAILED DESCRIPTION OF THE PREFERRED EMBODIMENTS

Before proceeding to the Detailed Description of the Preferred Embodiments, several general comments can be made about the applicability and the scope of the invention. Firstly, while reference is made throughout the following discussion to positional control of an implement mounted to a tractor hitch assembly, it should be understood that the present control system is more generally applicable to implement position control in general. Thus, control systems employing the elements recited in the appended claims and used to position an implement other than on a conventional tractor hitch, such as a trailed or towed implement, are equally within the intended scope of the invention. Secondly, while the control scheme presently preferred and described below for determining the maximum response rate of the control system to draft errors makes use of a fuzzy logic approach, other logic structures could be implemented where appropriate. Moreover, the particular membership functions, categories, logic rules and combinational methods described in connection with the control logic for determining the response rate limits are provided here by way of example only. It should be understood that alternative functions, categories, functions and combinational methods may be selected or adapted for particular vehicles and implements. Finally, while the preferred embodiment described below incorporates a hydraulic system, including valving and a hydraulic actuator, for positioning the implement, other types of positioning devices could be used where appropriate, such as electrical actuators and the like.

Figure 1:
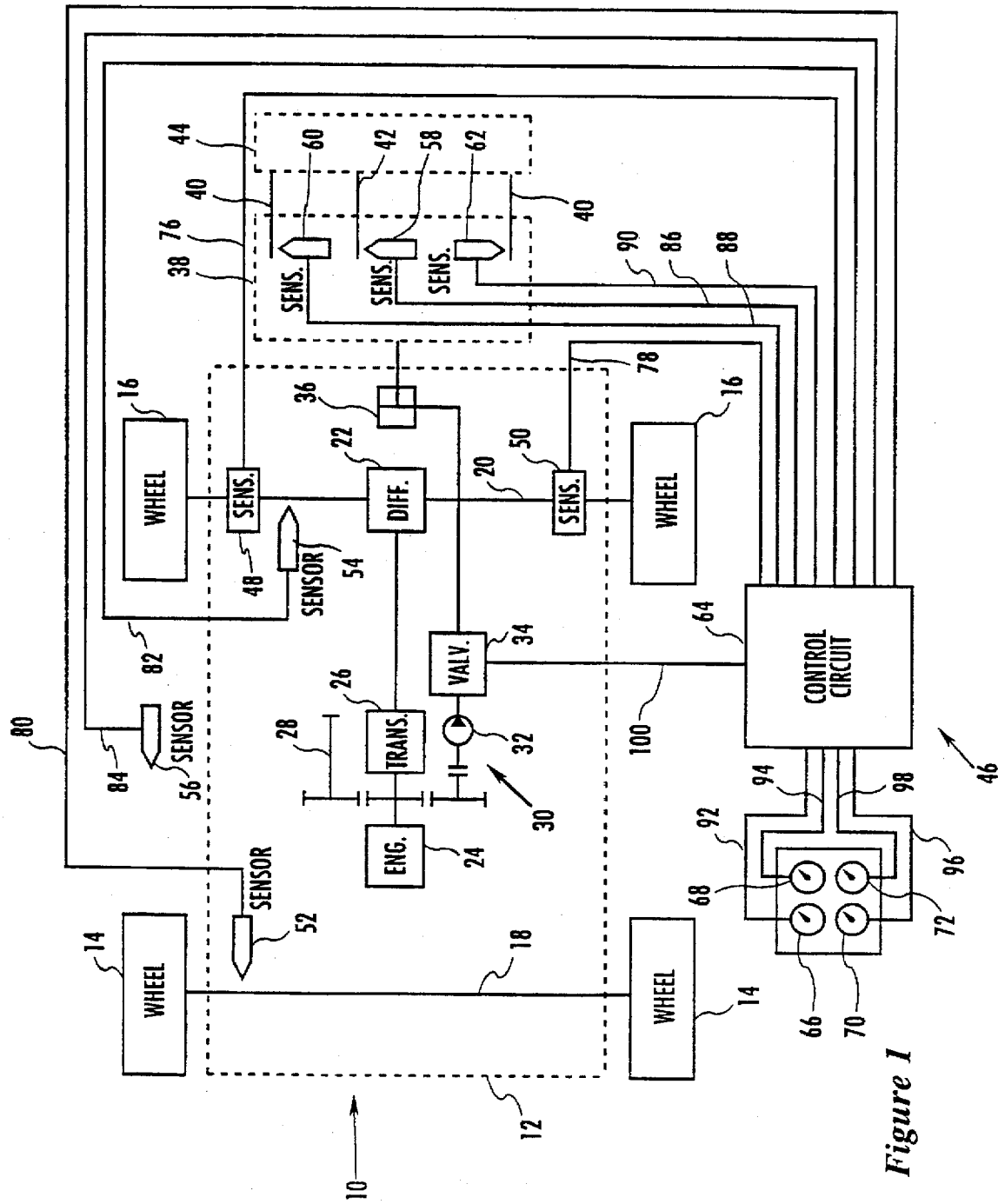
FIG. 1 is a diagrammatical representation of a tractor equipped with a control system in accordance with the invention for positioning an implement in response to a plurality of operating parameters including draft force.

Turning now to the FIGURES and referring first to FIG. 1, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Tractor 10 also includes a power plant or engine 24 coupled through a transmission 26 to differential 22 such that engine 24 may selectively drive rear wheels 16 in a number of forward and reverse gears. Tractor 10 typically includes auxiliary systems coupled to engine 24, such as a power take off shaft 28 for driving implements and other detachable equipment.

A hydraulic system 30 is coupled to engine 24 to provide a source of pressurized fluid for powering various actuators. As illustrated in FIG. 1, hydraulic system 30 includes a hydraulic pump 32 piped to a fluid reservoir (not shown) and to valving 34 for regulating and directing pressurized fluid to various hydraulic components. One such component is illustrated in FIG. 1 in the form of a linear actuator or double-acting cylinder 36 coupled to a hitch assembly 38. Hitch assembly 38 may be a conventional three-point hitch having lower and upper hitch links 40 and 42 for supporting a working implement 44, such as a plow. Moreover, valving 34 preferably includes solenoid operated proportional valves for directing a flow of pressurized fluid to actuator 36 for raising and lowering hitch assembly 38 and implement 44 as commanded by an operator or control system as described below, such as to vary the penetration of implement 44 into ground being worked.

As illustrated in FIG. 1, tractor 10 is equipped with a control system, designated generally by the reference numeral 46 for controlling the position of hitch assembly 38 and implement 44. While control system 46 may include more or fewer of the elements shown in FIG. 1, it will typically include brake sensors 48 and 50 coupled to the rear service brakes of tractor 10, speed sensors 52 and 54 coupled to the front and rear axles 18 and 20 respectively, a true ground speed sensor 56 (e.g. a radar-based speed sensor or non-powered wheel speed sensor in a 2-wheel drive tractor), a hitch position sensor 58 and draft force sensors 60 and 62. Control system 46 also includes a control circuit 64 and command devices 66, 68, 70 and 72 which may be provided on a single or multiple control consoles in the tractor cab (not shown).

In operation, brake sensors 48 and 50 detect the application of the tractor service brakes and generate braking signals upon application of the brakes. These braking signals are applied to control circuit 64 via conductors 76 and 78 respectively. Of course, for control systems employing control routines that do not make use of braking signals, sensors 48 and 50 may be omitted. Speed sensors 52 and 54, which may include a variable inductance magnetic pickup, detect the rotational velocity of front wheels 14 and rear wheels 16, respectively, and generate speed signals representative thereof. These speed signals are transmitted to control circuit 64 via conductors 80 and 82. True ground speed sensor 56 is typically a radar device mounted to the body 12 of tractor 10 and configured to emit radar signals toward the ground and to receive a portion of the signals rebounding from the ground to determine the speed of travel of tractor 10. Sensor 56 then generates a speed signals representative of the tractor speed and transmits this signal to control circuit 64 via conductor 84.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit for differential 22. Speed signals from sensors 52, 54 and 56 may be used to calculate a driven wheel slip value for use in controlling implement position. Moreover, it should be understood that other, additional sensors may be provided on tractor 10 for additional control routines. For example, such sensors might provide signals indicative of engine speed for use in regulating engine throttling or implement position as desired. Moreover, it should be understood that the various control functions required for operation of tractor 10, including the implement control functions discussed below, may be executed by a single control circuit 64 or by separate, dedicated control circuits taking as inputs only the parameter signals necessary for their precise function.

Control of the position of implement 44 is generally based upon information relating to the sensed implement position and draft force. This information is provided via position sensor 58 and draft sensors 60 and 62. Thus, position sensor 58, which is typically a rotary or linear potentiometer or linear variable differential transformer (LVDT) coupled to a linkage 42 of the tractor hitch assembly 38, detects the position or elevation of implement 44 and generates a position signal representative thereof. This position signal is conveyed to control circuit 64 via a conductor 86. Draft sensors 60 and 62, which typically include resistance strain gauges applied to links 40 of hitch assembly 38, generate draft signals representative of the force exerted on links 40. These draft signals are transmitted to control circuit 64 via conductors 88 and 90, respectively. Thus, control circuit 64 receives signals representative of both the position of implement 44 and the draft force generated by interaction of implement 44 with the ground.

In addition to sensed values of the operating parameters discussed above, control circuit 64 receives command or reference values from command devices 66, 68, 70 and 72, which typically include potentiometers positionable via suitable knobs or handles (not shown). For the purposes of implement position control, command device 66 provides an implement position command signal representative of the desired position of implement 44, and device 68 provides a draft command value representative of the desired level of draft force on implement 44. Devices 70 and 72 provide other command inputs for control of various functions of tractor 10, such as a desired level of wheel slip and a hitch up or hitch down override switch signal. Signals from devices 66, 68, 70 and 72 are applied to control circuit 64 via conductors 92, 94, 96 and 98 respectively. Based upon the reference values supplied by command devices 66 through 72 and upon the sensed values from sensors 48 through 62, control circuit 64 generates control signals for raising and lowering implement 44 and applies these control signals to valving 34 via conductor 100 to move actuator 36.

Figure 2:
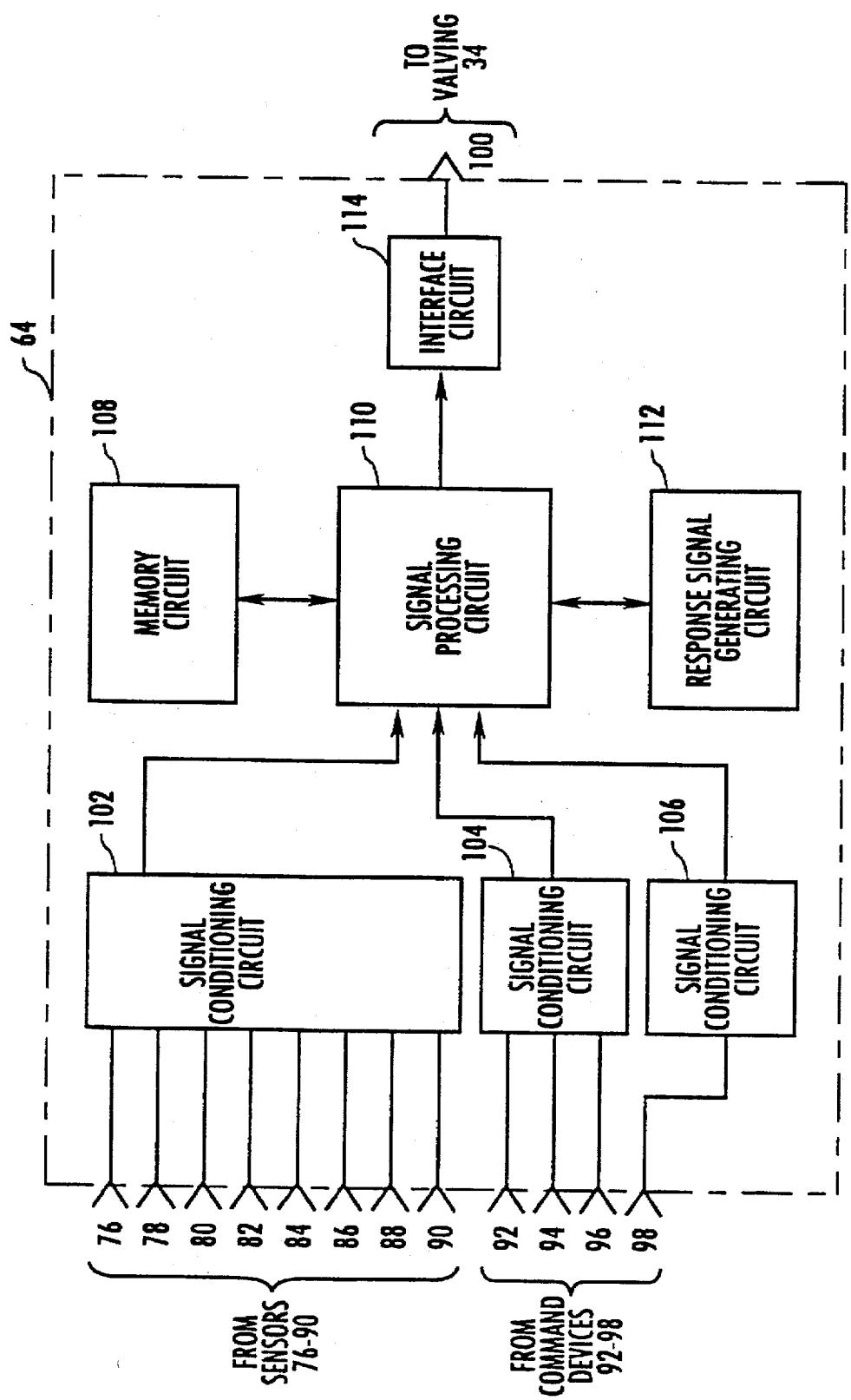
FIG. 2 is a block diagram illustrating certain of the principal circuits included in the controller for the inventive system shown in FIG. 1.

Certain of the sub-circuits included in control circuit 64 are illustrated diagrammatically in FIG. 2. Control circuit 64 includes signal conditioning circuits 102, 104 and 106, a memory circuit 108, a signal processing circuit 110, a response signal generating circuit 112 and an output signal interface circuit 114. While these various circuits are illustrated in FIG. 2 as separate, interconnected elements, it should be understood that all or some of these circuits may be included in a single integrated circuit and may comprise internal circuitry of an appropriately configured (programmed) microprocessor.

Input signals from sensors 76 through 90 are applied to signal processing circuit 110 through signal conditioning circuit 102, which will typically include an analog-to-digital converter and appropriate isolation, depending upon the type of sensors utilized and the nature of the signals produced. Similarly, signals from command devices 92, 94 and 96 are applied to signal processing circuit 110 via signal processing circuit 104, which may be substantially identical to circuit 102 and generally includes an analog-to-digital converter. Moreover, circuits 102 and 104 may be a single circuit. Circuits 102 and 104 receive the input signals from the sensors and command devices, produce digital signals or values representative of the various input signals and apply these values to signal processing circuit 110. Circuit 106 receives command input signals from other devices, such as device 70, which generally produce discrete (e.g. on/off) signals for controlling operation of signal processing circuit 110. Circuit 106 typically includes a multiplexer and appropriate isolation, permitting signal processing circuit 110 to select and access signals applied to circuit 106.

Memory circuit 108 preferably includes both volatile and non-volatile memory, such as random access memory (RAM), electronically programmable read only memory (EPROM) and electronically erasable programmable read only memory (EEPROM). The volatile memory of circuit 108 is generally used to store various parameter and intermediate values used during the control functions of signal processing circuit 110. Non-volatile memory, such as EPROM, serves to store the cyclic control routine implemented by signal processing circuit 110, while other non-volatile memory, such as EEPROM, serves to store the calibration values and failure signals indicative of failure of non-responsiveness of system components. Response signal generating circuit 112, which will typically be included in the circuitry of signal processing circuit 110, but is illustrated as a separate circuit here for explanatory purposes, receives intermediate values of draft error and draft derivative (rate of change of draft force) and generates a response signal representative of the maximum rate of movement of implement 44 in response to draft errors as described more fully below. This response signal is applied to signal processing circuit 110 to adjust control signals generated by circuit 110. These adjusted control signals, in the form of pulse-width-modulated (PWM) output signals, are applied to output signal interface circuit 114, which includes appropriate valve drivers for energizing the solenoids of valving 34 and thereby to move actuator 36 in the desired direction and at a desired rate. It should be noted that the adjusted control signals produced by circuit 110 could have forms other than PWM signals and, where actuators other than hydraulic cylinders and the like are used for moving the implement, these control signals are, of course, adapted for the particular actuator type used.

Control of the position or elevation of implement 44 is generally carried out as follows. Control circuit 64 monitors the command or reference values for implement position and implement draft force from command devices 66 and 68 respectively. These values are filtered and compared to sensed position and draft force values from sensors 58, 60 and 62 in accordance with a cyclic control routine. A number of such routines, following a variety of control schemes, are known in the art and do not, in themselves, form part of the present invention. While different manufacturers may utilize, different control routines, depending upon the type and class of vehicle being controlled and upon the parameters governing implement movement, these routines typically generate control signals for moving the implement up or down depending upon the deviation of the sensed values for at least the draft force and the implement position from the reference or command values for those parameters. Moreover, these routines may select the greater of two or more parameter error values or combine two or more parameter error values to generate the implement control signals. However, most known systems of this type ultimately generate control signals in the form of PWM signals, the duty cycle of which is proportional to the error signal forming the basis for control. These PWM signals are then applied, through an appropriate valve driver, to the solenoid of a proportional hydraulic valve to raise or lower the implement at a rate proportional to the PWM control signal duty cycle.

In accordance with the present invention, the rate of response of control system 46 to deviations in the sensed draft force from the reference draft force is adjusted automatically by control system 46. The presently preferred method of adjusting the response rate is to generate a response signal representing the maximum PWM duty cycle of the control signals applied to valving 34 by control circuit 64. Because the flow rate of pressurized fluid applied to actuator 36 through valving 34 is proportional to this PWM duty cycle, limiting the duty cycle effectively limits the flow rate of fluid to the actuator, thereby limiting the maximum rate of movement of implement 44.

Figure 3:
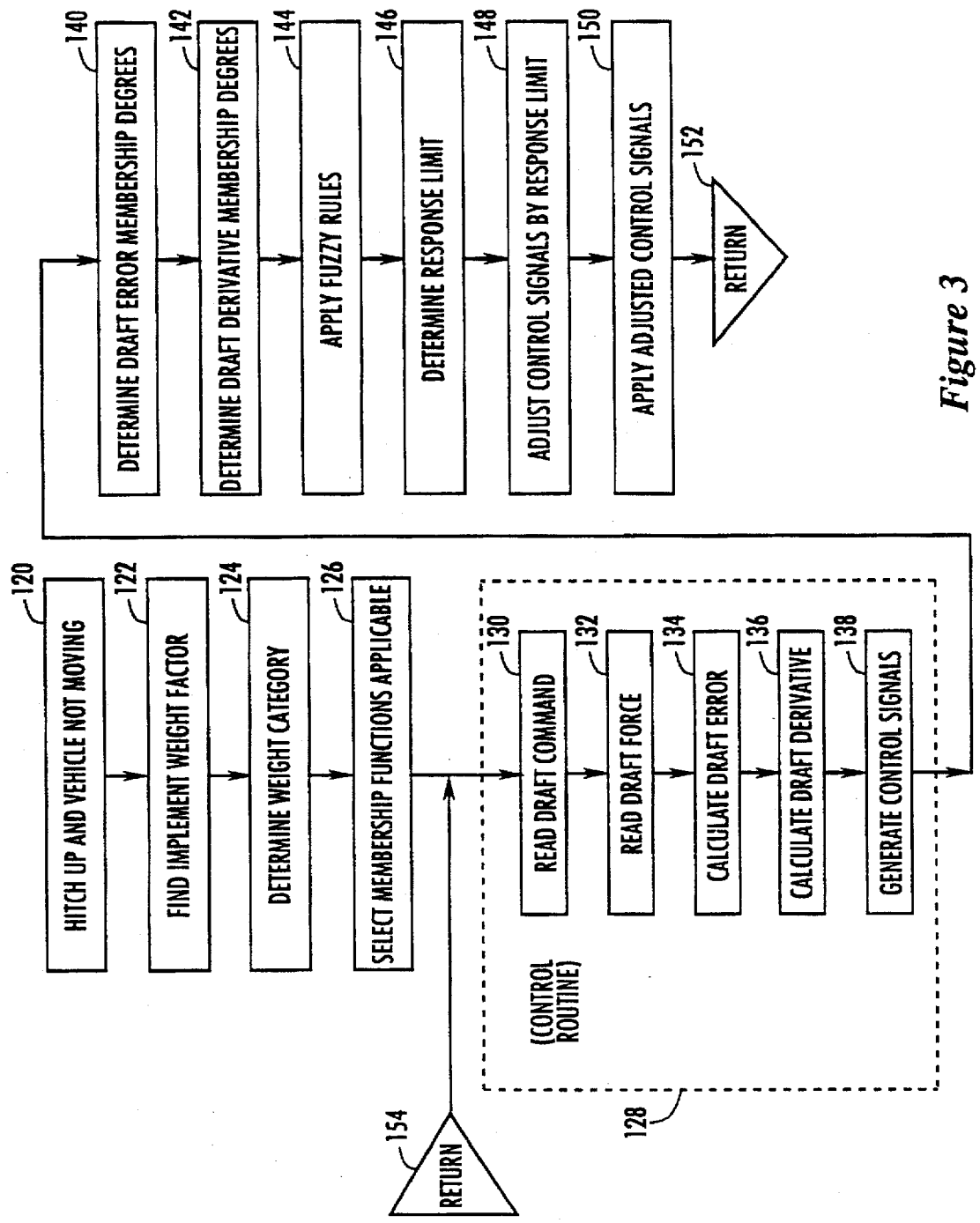
FIG. 3 is a flow chart generally representing typical control logic implementing an implement control approach in accordance with the invention.

The presently preferred method of generating the response signal for limiting the rate of movement of implement 44 makes use of both the draft error signal and the derivative of the sensed draft signal, combining the effect of these values through fuzzy logic as illustrated in the flow chart of FIG. 3. It should be noted that the control logic summarized in FIG. 3 will generally be included in a larger cyclic control routine implemented by control circuit 64. Moreover, it should be understood that while the specific embodiment of the fuzzy logic control routine described below is preferred, alternative routines and variations on the preferred routine can be readily made with the use of commercially available control system design software, such as the Fuzzytech Explorer Edition software available from Inform Software Corporation. It should be noted that, while the parameters presently preferred for controlling the response rate of implement positioning are draft error and draft derivative, other parameters could be used in place of or in addition to these parameters, such as engine speed, wheel slip and so on.

As illustrated in FIG. 3, before entering to the cyclic control routine for implement position control, which begins at step 128, control circuit 64 determines the weight category for the implement 44 carried or trailed by tractor 10. To determine this category, tractor 10 must be stopped and the hitch assembly 38 (or more generally implement 44) must be in a raised position as illustrated at step 120. These conditions are generally verified by control circuit 64 by reference to a speed signal from one of the speed sensors 52, 54 or 56 and to a position signal from position sensor 90. At step 122, with the implement in the raised position, control circuit 64 detects the draft signals generated by draft sensors 60 and 62. While these draft signals generally will not directly measure implement weight, they provide an indication of the relative weight of the implement, referred to here as the weight factor. This weight factor may be determined by calculating the average of the draft signals. At step 124, signal processing circuit 110 relates the weight factor to one of several weight categories. In the presently preferred embodiment, the weight factor is related to one of four implement weight categories, including "light," "medium," "heavy" and "very heavy." More or fewer categories may, of course, be used, depending upon the precision desired in the control of the response signal level. Moreover, the precise weight levels at which the divisions between the classifications occur will typically be determined empirically, and will generally depend upon the types and sizes of implements which tractor 10 is capable of manipulating.

Figure 4:
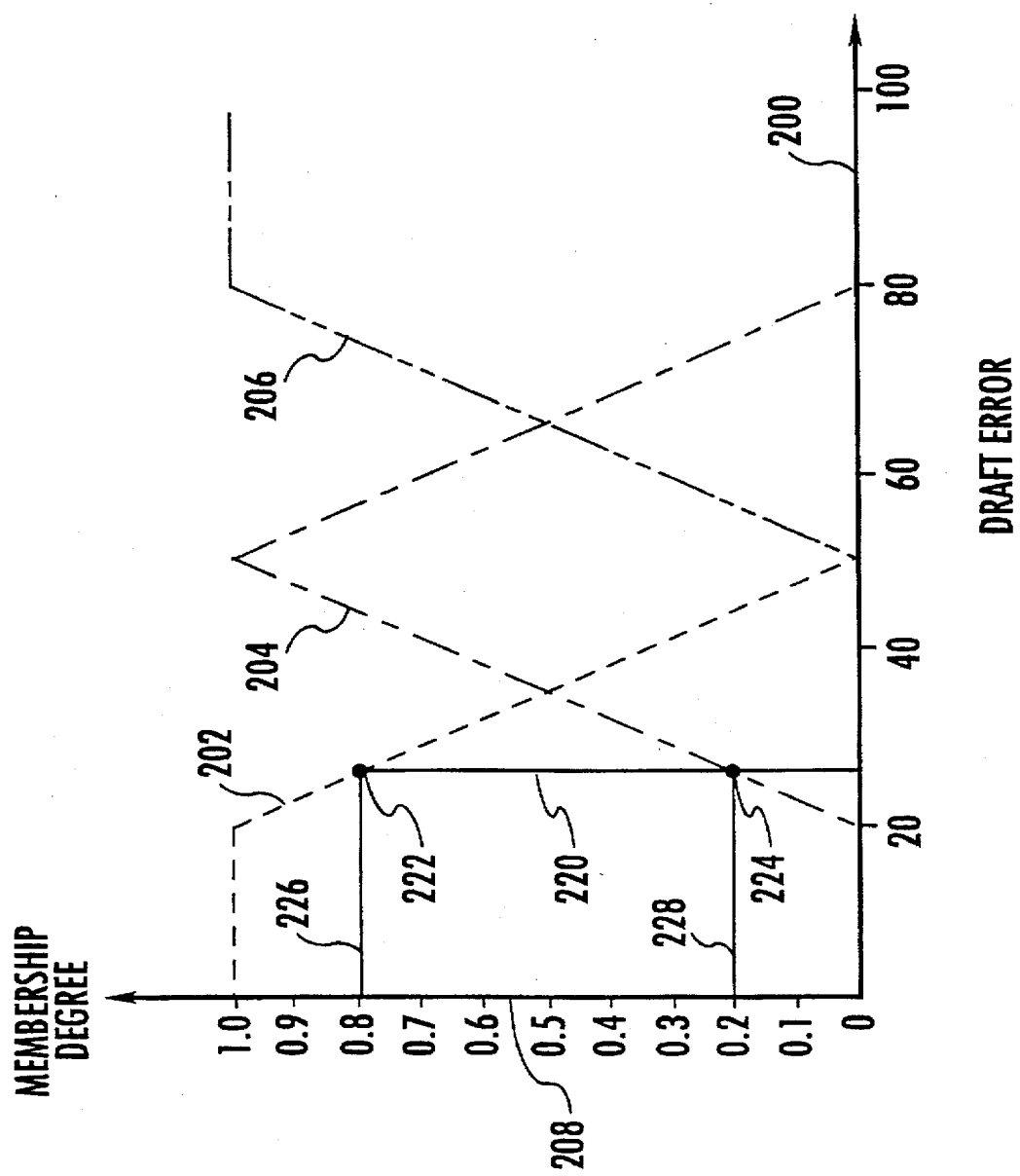
FIG. 4 is a graphical representation of membership functions for various draft error values for use in the control logic illustrated in FIG. 3, wherein the control system response rate is determined through the use of fuzzy logic.
Figure 5:
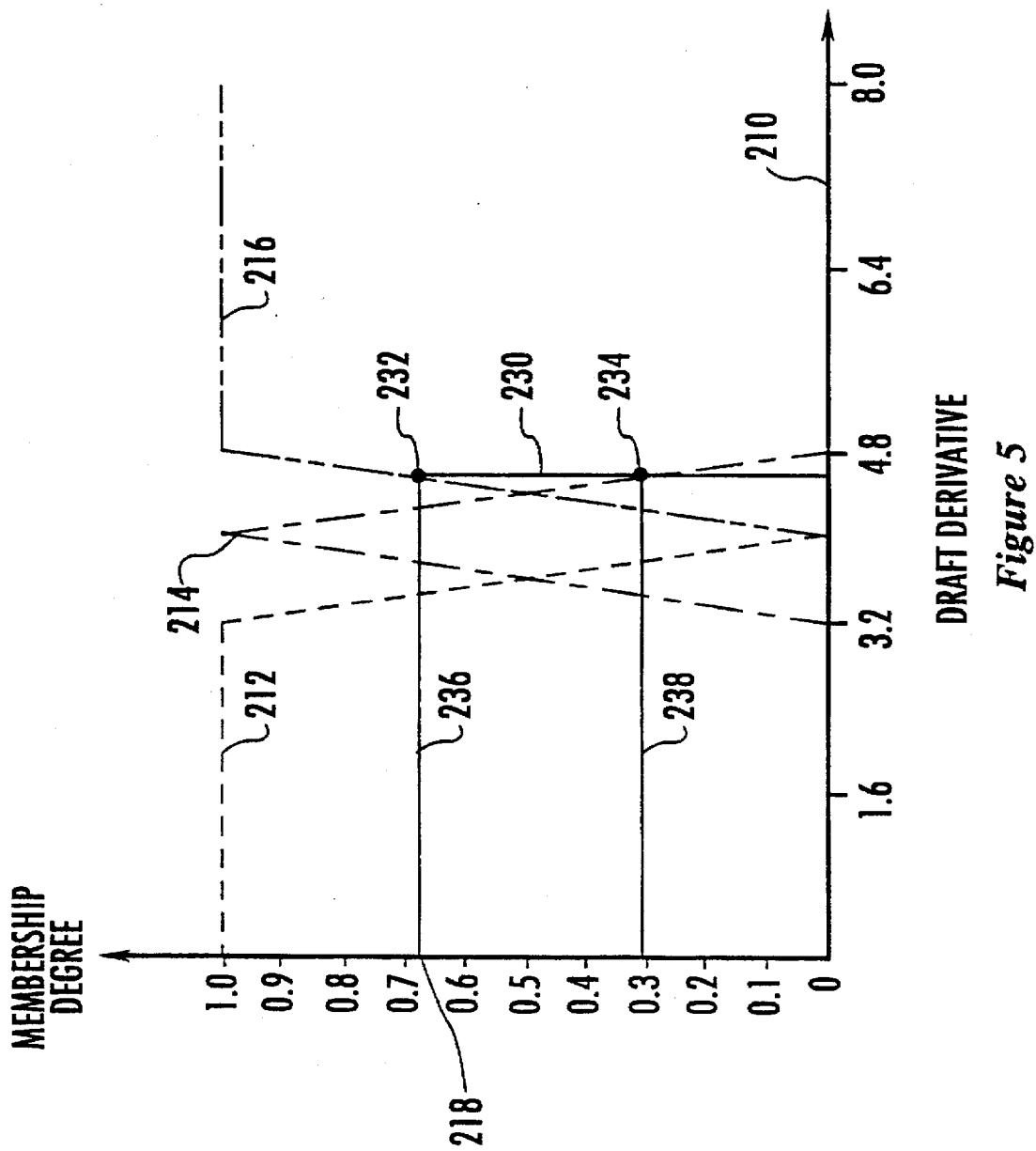
FIG. 5 is a graphical representation of membership functions for various draft derivative values.

At step 126, signal processing circuit 110 relates the weight category determined at step 124 to a predetermined set of membership functions stored in memory cirucit 108 for the later use in the fuzzy logic control of the response signal. FIGS. 4 and 5 illustrate typical membership functions for draft error and draft derivative values for one implement weight category. Membership functions of the type illustrated in the FIGURES are used to determine degrees of membership in fuzzy sets as described below. Generally however, the precise number of fuzzy sets and the limits of each set as defined by the membership functions is determined empirically for the particular vehicle being controlled, taking into account such factors as the size, weight and power of the vehicle and the weight of the implements the vehicle can manipulate. Moreover, different membership functions are preferably used for a given vehicle depending upon the weight of the implement currently coupled to the vehicle. Thus, in the presently preferred embodiment, at step 126, signal processing circuit 110 selects one of four predetermined membership functions for draft error and one of four membership functions for draft derivative generated for the weight categories identified for tractor 10. These membership functions are preferably stored in a non-volatile portion of memory circuit 108, such as EPROM, and typically differ somewhat in the precise limits of the various membership sets.

Once these membership functions are selected, the implement may be lowered to a working position and implement position control follows the preset control routine as indicated by reference numeral 128, implemented by control circuit 64. As mentioned above, this control routine may include steps for detecting, filtering, comparing and combining a number of different operating parameters, including position, draft force, slip, engine speed and so on. However, the routine includes at least the steps of reading a draft command or reference value at step 130, reading the sensed draft force at step 132 and calculating a draft error, representing the difference between the draft reference value and the sensed draft force value, at step 134. Intermediate steps may include conditioning the draft reference and sensed draft values, such as by filtering to remove noise and other transients in the signals. In addition, the routine preferably includes the step of calculating the draft time derivative value at step 136. This derivative value is calculated by first finding the difference between the sensed draft (or filtered draft) force value for the current routine cycle and the same value for the previous routine cycle, then dividing this difference by the duration of the routine cycle. The resulting derivative value is indicative of the rate of change in the sensed draft force. Alternatively, the derivative value could be based on the change in the sensed draft force over more than one routine cycles.

As mentioned above, control routine 128 may include further steps, such as for comparing other parameter values to generate error values, combining parameter or error values, generating reference values and selecting particular modes of operation, such as position mode, draft mode and the like. However, the control routine ultimately includes a step 138 in which control circuit 64 generates control signals, preferably in the form of PWM signals, for moving implement 44 up or down. These control signals are then adjusted or limited by control circuit 64 as follows.

At steps 140 and 142, signal processing circuit 110 references the selected draft error and draft derivative membership functions selected at step 126 from memory circuit 108 to determine the degrees of membership of the calculated draft error value and draft derivative value in the sets defined by the functions. During this phase of the control routine reference signal processing circuit 110 accesses the values of the draft error and draft derivative calculated at steps 134 and 136 respectively. However, because only the magnitude of these values affects the desired response rate, the absolute values of the draft error and draft derivative are used in steps 140 and 142 and not the direction or sign of these values.

While signal processing circuit 110 will generally determine the degrees of membership at steps 140 and 142 based upon stored equations representing the membership functions selected at step 126, graphically, this process may be understood as follows. As can be seen from FIGS. 4 and 5, by locating any given level of draft error value and draft derivative value along the abscissa of FIGS. 4 and 5 respectively, degrees of membership in fuzzy sets, called "small," "medium" and "large," may be identified or correlated to the values. Specifically, by locating a draft error signal along abscissa 200 of FIG. 4, the degree of membership in the draft error sets "small," "medium" and "large" can be read from ordinate 208 by finding the intersection of a vertical line from the draft error value with lines 202, 204 and 206, respectively, and then following a horizontal line from each point of intersection to the ordinate 208. Similarly, by locating a draft derivative value along abscissa 210 of FIG. 5, the degree of membership in the derivative sets "small," "medium" and "large" can be determined from ordinate 218 by finding the intersection of a vertical line from the derivative value with lines 212, 214 and 216, respectively, and following a horizontal line from each point of intersection to ordinate 218.

By way of example, assume a current draft error value having a magnitude of 25(i.e. 25 or −25) is calculated at step 134. By following a vertical line 220 from a point 25 along abscissa 200 in FIG. 4 to point of intersection with the membership set lines 202 and 204, intersection points 222 and 224 are located. These points indicate that the current level of draft error is a member of the "small" error set (defined by line 202) and the "medium" error set (defined by line 204). The degrees of membership in these two sets is determined by following horizontal lines 226 and 228 from the points of intersection to the ordinate axis 208. The resulting membership degrees are approximately 0.8 in the small error set and 0.2 in the medium error set. In the example, an error value of 25 is not a member of the large error set.

Similarly, for a draft derivative value of approximately 4.5, a vertical line 230 from abscissa 210 in FIG. 5, points of intersection 232 and 234 are located where line 230 meets lines 216 and 214 respectively. These points of intersection indicate that the draft derivative value is a member of the medium derivative set and the large derivative set. To find the degree of membership in each of these sets, horizontal lines 236 and 238 are followed from the points of intersection to the ordinate axis 218. In the example, the derivative value 4.5 has membership degrees of approximately 0.32 in the medium set and 0.68 in the large set.

At step 144, based upon the memberships determined at steps 140 and 142, signal processing circuit 110 applies logic rules, preferably in the form of fuzzy logic rules, to determine membership of the response signal in response sets. These logic rules will generally be incorporated into the control routine executed by signal processing circuit 110 as a series of logical comparisons. In the presently preferred embodiment, five fuzzy logic rules are applied to the draft error and draft derivative set memberships:

1. If draft error is large, make response large;
2. If draft error is small AND draft derivative is small, make response small;
3. If draft derivative is large, make response large;
4. If draft error is medium AND draft derivative is not large, make response medium; and
5. If draft derivative is medium AND draft error is not large, make response medium.

These logic rules are interpreted and applied in accordance with generally known fuzzy logic control theory. Several general comments can be made regarding this interpretation. First, when the current draft error and draft derivative values correspond to more than one of these rules, both rules apply and signal processing circuit 110 stores the result dictated by these rules for use in later processing steps. Moreover, for the rules having a logical "AND" criterion, such as rules 2, 4 and 5, signal processing circuit 110 sets the degree of membership in the response value set dictated by the rule equal to the lesser of the degrees of membership of the draft error and draft derivative values in their respective sets mentioned in the rule. Finally, the logical operator "not" as found in rules 4 and 5, is interpreted as the complement of the membership degree in the large set. That is, the "not large" membership degree is 1.0 minus the large set membership degree.

Thus, for the exemplary values mentioned above, a draft error value of 25 is a member of the small and the medium draft error sets and a draft derivative value of 4.5 is a member of the medium and large draft derivative sets. This condition generally indicates that for an implement of the weight category determined at step 124, the draft error is relatively small to medium, but the draft level is changing (i.e. has a derivative) at a medium to high rate. Applying the logic rules summarized above, signal processing circuit 110 would find that rules 3, 4 and 5 apply. Thus, the degree of membership of the desired response signal in the large response set is 0.68, equal to the degree of membership of the draft derivative value in the large derivative set by application of rule 3. By application of rule 4, the degree of membership of the desired response signal in the medium response set is 0.2, equal to the degree of membership of the draft error in the medium draft error set (less than the "not large" membership of the draft error: 1.0−0.68=0.32). Similarly, the degree of membership of the desired response signal in the medium response set is approximately 0.32, determined by application of rule 5 and by taking the smaller of the draft derivative medium set membership (i.e. approximately 0.32) and the draft error "not large" set membership (i.e. 1.0−0=1.0). The degree of membership of the response signal in the small set is zero. It should be noted that, as indicated above, although rules 4 and 5 both assign membership degrees in the medium set, both rules are applicable and affect the ultimate response value.

With these response set membership degrees thus determined, signal processing circuit 110 advances to step 146 where the response limit is determined from the membership degrees. In order to do so, the response set fuzzy membership degrees are first converted to a "crisp" value for the response limit. While several methods are available for converting output membership degrees to crisp output signals, the presently preferred method is by weighted average, applying membership functions of the type illustrated in FIG. 6. In this method, the degree of membership (read from vertical axis 240) in the response set dictated by each applicable rule is multiplied by the response value for that set (read from horizontal axis 242), as indicated by functions 244, 246 and 248 in FIG. 6. The resulting values are added together and the sum is divided by the sum of the applicable response set values. The weighted average method may be summarized as follows:

Σ [each response set membership degree (from step 144) × response set value (from FIG. 6)]/Σ[each applicable response set membership degree].

Applying this method to the example discussed above results in the following:

[(0.68×10.0)+(0.2×6.0)+(0.32×6.0)]/(10.0+6.0+6.0)=0.45;

where the value 0.68is the degree of membership of the response signal in the "large" set, the value 10.0is the response set value corresponding to the "large" set, 0.2and 0.32are the degrees of membership of the response signal in the "medium" set and the value 6.0is the response set value corresponding to the "medium" set.

Figure 6:
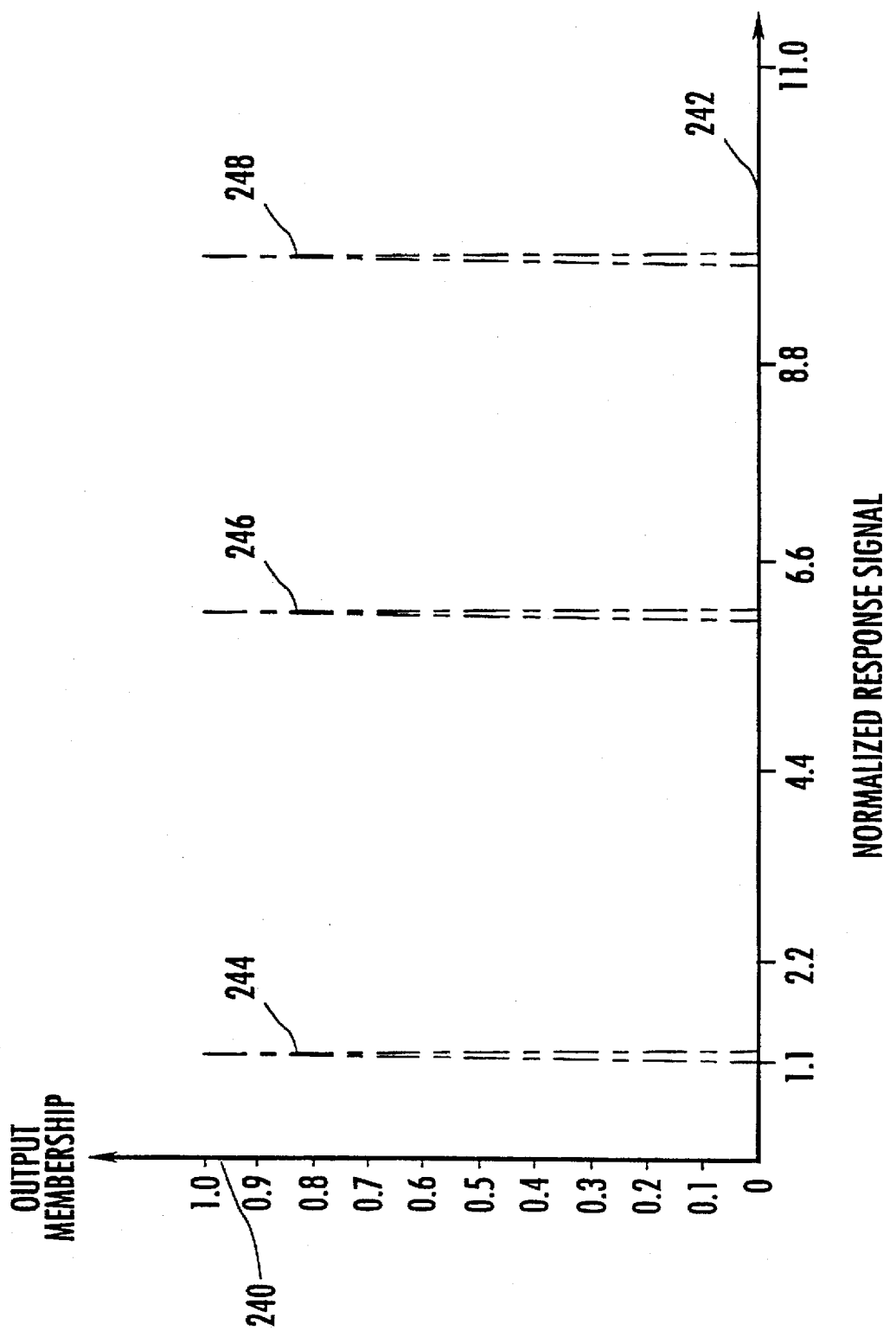
FIG. 6 is a graphical representation of output membership functions used to determine the response rate limit after application of fuzzy rules to the membership degree values determined from FIGS. 4 and 5.

It should be noted that other methods for combining the membership degrees resulting from the particular logic rules applied at step 144 may be adopted at step 146. In particular, another useful combination method, generally referred to as the centroid method, effectively combines the areas beneath each output membership set. However, because preferred shapes of the output membership functions, as illustrated in FIG. 6, essentially impose single values of response (i.e. pulse-type functions) for each output set, the weighted average method affords essentially the same result as would the centroid method.

The factor resulting from this combination method at step 146 represents the response limit for the particular weight class of the implement and the particular combination of draft error and draft derivative values. In the presently preferred method, this value is then correlated, also at step 146, to levels of PWM control signals corresponding to known rates of movement of implement 44. These response rate-correlated control signal levels will typically be determined empirically and stored, such as in the form of a look-up table, in memory circuit 108. In the preferred embodiment, this control signal limit is expressed in percent of the maximum PWM duty cycle used to drive valving 34.

It should be noted that where forms of control signal other than PWM signals are used to move implement 44, the control signal limit value assigned at step 146 will, of course, be a comparable value (e.g. a current level). In addition, alternative techniques may be used for determining the control signal limit imposed by the response level determined at step 146. For example, the value determined at step 146 could be treated as a normalized response factor or signal, representing the maximum permissible duty cycle of the PWM control signals used to drive valving 34.

At step 148, signal processing circuit 110 compares the control signal limit determined at step 146 to the control signal generated at step 138. If the limited control signal level is greater than the control signal from step 138, signal processing circuit 110 applies the latter signal level to drive actuator 36. However, if the limited control signal from step 146 is lower than the signal determined at step 138, signal processing circuit 110 applies the limited control signal is used for implement movement control, thereby limiting or capping the rate of movement to the response rate determined at steps 140 through 146.

At step 150, signal processing circuit 110 applies the adjusted control signals to valving 34 through interface circuit 114 to open or close a proportional hydraulic valve included in the valving and thereby cause movement of actuator 36 and implement 44. At step 152, the control routine cycle is completed and signal processing circuit 110 returns or loops back to step 154 to repeat the control routine summarized above.

We claim:

1. An apparatus for controlling the elevation of an implement carried or trailed by a vehicle, the implement being coupled to an implement positioning system including an actuator for selectively raising and lowering the implement in response to control signals, the apparatus comprising:

a draft sensor for detecting draft force on the implement caused by interaction of the implement with the ground and for generating draft force signals representative thereof;

a draft force command device configured to generate draft force reference signals;

a control circuit coupled to the draft sensor, to the draft force command device and to the actuator, the control circuit determining draft force error values based upon the difference between the draft force signals and the draft force reference signals and generating control signals for causing movement of the actuator based at least upon the draft force error values, the control circuit generating the control signals in the form of pulse-width-modulated signals having predetermined duty cycles, the rate of movement of the actuator being proportional to the duty cycle of the control signals; and a response signal generating circuit coupled to the control circuit to automatically limit a response rate of the actuator in response to the control signals by limiting the duty cycle of the control signals.

2. The control system of claim 1, wherein the response signal generating circuit limits the response rate of the actuator based upon the draft force error values.

3. The control system of claim 1, wherein the control circuit and the response signal generating circuit are included in a programmed microprocessor.

4. The control system of claim 1, further comprising at least one sensing device for generating a weight signal representative of the weight of the implement.

5. A method for controlling the rate of elevational movement of an implement carried or trailed by a vehicle and capable of being raised and lowered in response to control signals, the method comprising the steps of:

sensing a draft force resulting from interaction between the implement and the ground;

setting a desired level of draft force;

generating a draft error value representative of the difference between the sensed draft force and the desired draft force;

generating control signals to selectively raise and lower the implement based at least on the draft error value, the control signals being pulse-width-modulated signals having a duty cycle proportional to the rate of movement of the implement;

generating a movement rate limiting signal based at least on the draft error value; and limiting the rate of movement of the implement by limiting the duty cycle of the control signals in response to the control signals based on the rate limiting signal.

6. The method of claim 5, wherein the limit on the rate of movement of the implement is determined by classifying the draft error value in at least two sets in accordance with predetermined membership functions and generating a response signal representative of the limit on the rate of movement based upon the degree of membership of the draft error value in the sets.

7. The method of claim 6, comprising the further steps of generating a weight signal representative of the weight of the implement carried or trailed by the vehicle and selecting predetermined membership functions based upon the weight signal.

8. The method of claim 5, including the further step of generating a draft derivative value representative of the rate of change of the sensed draft force and wherein the rate of movement of the implement in response to the control signals is limited based on the draft error value and the draft derivative value.

9. The method of claim 8, wherein the limit on the rate of movement of the implement is determined by classifying the draft error value and the draft derivative value in at least two respective sets in accordance with predetermined membership functions and generating a response signal representative of the limit on the rate of movement based upon the degree of membership of the draft error value and the draft derivative value in the sets.

10. The method of claim 9, comprising the further steps of generating a weight signal representative of the weight of the implement carried or trailed by the vehicle and selecting predetermined membership functions for the draft error value and the draft derivative value based upon the weight signal.

11. A method for controlling the elevation of an implement carried or trailed by a vehicle, the implement being coupled to an actuator for selectively raising and lowering the implement in response to control signals, the method comprising the steps of:

sensing a parameter proportional to the weight of the implement and generating a weight signal representative thereof;

categorizing the implement into one of at least two weight categories;

generating control signals for moving the actuator to selectively raise and lower the implement; and limiting the rate of movement of the implement based upon the weight category of the implement.

12. The method of claim 11, comprising the further steps of:

detecting draft force resulting from interaction of the implement with the ground and generating a sensed draft force signal representative thereof;

generating a reference draft force signal representative of a desired level of draft force;

generating a draft force error signal representing the difference between the sensed draft force signal and the reference draft force signal; and selecting draft force error membership functions based upon the weight of the implement, the draft force error membership functions classifying the draft force error signal in at least two draft error sets by degree;

wherein the rate of movement of the implement is limited based at least upon the degree of membership of the draft force error signal in the draft error sets.

13. The method of claim 12, comprising the further steps of:

generating a draft derivative signal representing the rate of change of the sensed draft force;

selecting draft derivative membership functions based upon the weight of the implement, the draft derivative membership functions classifying the draft derivative signal in at least two draft derivative sets by degree;

wherein the rate of movement of the implement is limited based upon the degree of membership of the draft force error signal in the draft force error sets and the degree of membership of the draft force derivative in the draft force derivative sets.

14. An apparatus for controlling the elevation of an implement carried or trailed by a vehicle, the implement being coupled to an implement positioning system including an actuator for selectively raising and lowering the implement in response to control signals, the apparatus comprising:

a draft sensor for detecting draft force on the implement caused by interaction of the implement with the ground and for generating draft force signals representative thereof;

a draft force command device configured to generate draft force reference signals;

a control circuit coupled to the draft sensor, to the draft force command device and to the actuator, the control circuit determining draft force error values based upon the difference between the draft force signals and the draft force reference signals and generating control signals for causing movement of the actuator based at least upon the draft force error values; and a response signal generating circuit coupled to the control circuit to automatically limit a response rate of the actuator in response to the control signals based upon the draft force error values and the rate of change in the sensed draft force.

* * * * *